United States Patent
Guo et al.

(10) Patent No.: US 7,839,943 B2
(45) Date of Patent: Nov. 23, 2010

(54) METHOD OF FRAME SYNCHRONIZATION

(75) Inventors: Zhan Guo, Guangdong (CN); Gengshi Wu, Guangdong (CN); Feng Li, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 851 days.

(21) Appl. No.: 11/697,785

(22) Filed: Apr. 9, 2007

(65) Prior Publication Data

US 2008/0013573 A1 Jan. 17, 2008

(30) Foreign Application Priority Data

Jul. 14, 2006 (CN) .................. 2006 1 0098788

(51) Int. Cl.
*H04L 27/28* (2006.01)
(52) U.S. Cl. .................................... 375/260
(58) Field of Classification Search ................ 375/259, 375/260, 130, 140, 147, 148, 150, 316, 343, 375/295, 354
See application file for complete search history.

(56) References Cited

U.S. PATENT DOCUMENTS

| | | | |
|---|---|---|---|
| 5,953,311 A * | 9/1999 | Davies et al. ............... 370/210 |
| 6,181,714 B1 * | 1/2001 | Isaksson et al. ............. 370/491 |
| 6,366,619 B1 * | 4/2002 | McCallister et al. ........ 375/295 |
| 7,366,087 B2 * | 4/2008 | Lee et al. .................... 370/203 |
| 2002/0094050 A1 | 7/2002 | Usui et al. |
| 2003/0002434 A1 * | 1/2003 | Bott et al. ................... 370/210 |
| 2003/0072255 A1 | 4/2003 | Ma et al. |
| 2003/0179776 A1 | 9/2003 | Sumasu et al. |
| 2005/0152326 A1 | 7/2005 | Vijayan et al. |

FOREIGN PATENT DOCUMENTS

| | | |
|---|---|---|
| EP | 1045533 | 10/2000 |
| EP | 1282258 | 2/2003 |
| EP | 1282258 A1 * | 2/2003 |
| WO | WO98/00946 | 1/1998 |

\* cited by examiner

*Primary Examiner*—Kevin M Burd
(74) *Attorney, Agent, or Firm*—Finnegan, Henderson, Farabow, Garrett, Dunner LLP

(57) ABSTRACT

A method of frame synchronization includes: inserting synchronous pilots including odd synchronous pilots and even synchronous pilots in a frame; transmitting first signals on the odd synchronous pilots, and transmitting second signals of inverse values of the first signals transmitted on the odd synchronous pilots on the even synchronous pilots; synchronizing the frame according to the odd synchronous pilots and the even synchronous pilots. With the method provided by embodiments of the present invention, complexity of the frame synchronization may be decreased and delay of the frame synchronization may be reduced.

12 Claims, 4 Drawing Sheets

METHOD OF FRAME SYNCHRONIZATION

FIELD OF THE TECHNOLOGY

The present invention relates to information transmission technology, and more particularly, to a method of frame synchronization.

BACKGROUND OF THE INVENTION

Digital Video Broadcast (DVB) is a technique providing multimedia services to a terminal through a digital broadcast network and may be divided into three types according to their transmission modes, i.e., DVB-Terrestrial (DVB-T), DVB-Satellite (DVB-S) and DVB-Cable (DVB-C). Technical specifications for the DVB-S, DVB-C and DVB-T pave the way for high-speed data transmission through satellite, cable and terrestrial video channels respectively. DVB-Handheld (DVB-H) is a transmission standard proposed by the DVB organization for providing multimedia services to a portable/handheld terminal through a terrestrial digital broadcast network. The DVB-H is based on the current DVB-T transmission system and enables a portable/handheld terminal, such as a mobile phone, to receive video broadcast signals steadily by adding additional functions and improved techniques. Compared with a DVB-T terminal, the DVB-H portable/handheld terminal is of lower power-consumption and better performance of mobility and anti-interference. The DVB-H is applicable for portable/handheld terminals, such as a mobile phone and a portable computer to receive signals through the terrestrial digital video broadcast network.

Refer to FIG. 1, which is a schematic diagram of a pilot insertion pattern according to the DVB-T/H. As shown in FIG. 1, each frame consists of 68 Orthogonal Frequency Division Multiplexing (OFDM) symbols. Circles in FIG. 1 denote sub-carriers. And specifically, circles filled with biases denote continual pilots, solid circles denote scattered pilots and hollow circles denote data sub-carriers. Powers of constellations corresponding to the continual pilots and scattered pilots are normalized to 16/9.

Table 1 shows carrier indices for continual pilot carriers in one OFDM symbol according to the DVB-T/H. There are 45 continual pilot carriers for the 2048 Fast Fourier Transform (FFT) mode, i.e., 2K mode, and 89 continual pilot carriers for the 4K mode. Distances separating two continual pilot carriers are not uniform, and the minimum distance separating two continual pilot carriers is three sub-carriers.

TABLE 1

| 2K Mode | 4K Mode |
|---|---|
| 0, 48, 54, 87, 141, 156, 192, 201, 255, 279, 282, 333, 432, 450, 483, 525, 531, 618, 636, 714, 759, 765, 780, 804, 873, 888, 918, 939, 942, 969, 984, 1050, 1101, 1107, 1110, 1137, 1140, 1146, 1206, 1269, 1323, 1377, 1491, 1683, 1704 | 0, 48, 54, 87, 141, 156, 192, 201, 255, 279, 282, 333, 432, 450, 483, 525, 531, 618, 636, 714, 759, 765, 780, 804, 873, 888, 918, 939, 942, 969, 984, 1050, 1101, 1107, 1110, 1137, 1140, 1146, 1206, 1269, 1323, 1377, 1491, 1683, 1704, 1752, 1758, 1791, 1845, 1860, 1896, 1905, 1959, 1983, 1986, 2037, 2136, 2154, 2187, 2229, 2235, 2322, 2340, 2418, 2463, 2469, 2484, 2508, 2577, 2592, 2622, 2643, 2646, 2673, 2688, 2754, 2805, 2811, 2814, 2841, 2844, 2850, 2910, 2973, 3027, 3081, 3195, 3387, 3408 |

In accordance with the DVB-T/H, when a receiver of a terminal starts up or switches programs, a transmission mode and a length of Cycle Prefix (CP) are determined first, and then after symbol synchronization and correction of fractional frequency offset by the CP, correction of integral frequency offset is implemented by the continual pilots, and then, frame synchronization by Transmission Parameter Signalling (TPS) and channel estimation by the scattered pilots.

There are mainly two methods of frame synchronization by the TPS and further channel estimation by the scattered pilots. Method I: to receive the TPS by non-coherent demodulation, and implement the frame synchronization to determine the locations of the scattered pilots to perform the channel estimation. Method II: to match received signals using a pilot insertion pattern to find the locations of the scattered pilots to perform the channel estimation, receive the TPS by coherent demodulation according to the result of the channel estimation, and then accomplish the frame synchronization. The process of the frame synchronization by the TPS includes: reading 68 OFDM symbols first, demodulating the TPS. If the verification succeeds, it indicates that the 68 OFDM symbols belong to the same frame; otherwise, reading one more OFDM symbol, and demodulate the TPS for the new 68 OFDM symbols. The frame synchronization will not be accomplished until the verification succeeds.

The above methods of frame synchronization by the TPS involves large amount of calculation and the implementations are complex. Moreover, since a frame in the DVB-T/H consists of 68 OFDM symbols, the frame synchronization needs a long period of time and may exceed the duration of a frame, even reach 135 OFDM symbols. In addition, powers of pilot constellations are normalized to 16/9, which only have a power gain of about 2.5 db over those of data constellations. The unobviousness of the power gain of the pilot constellations to the data constellations makes it unfavourable for the frame synchronization, channel estimation and the estimation of the integral frequency offset. Furthermore, the distances separating the continual pilots are not average and the minimum distance separating two continual pilots is only 3 sub-carriers. In the case of the 4K mode, the bandwidth is 8 MHz, the frequency of the centre carrier is 700 MHz. When the frequency offset is −20 ppm~20 ppm, i.e., when the integral frequency offset is −7~7 sub-carriers, the distance is unfavourable for the estimation of the integral frequency offset.

SUMMARY OF THE INVENTION

Embodiments of the present invention provide a method of frame synchronization to decrease complexity of frame synchronization.

According to an embodiment of the present invention, the method of frame synchronization includes:

inserting synchronous pilots including odd synchronous pilots and even synchronous pilots in a frame;

transmitting first signals on the odd synchronous pilots, and transmitting second signals of inverse values of the first signals transmitted on the odd synchronous pilots on the even synchronous pilots;

synchronizing the frame according to the odd synchronous pilots and the even synchronous pilots.

In the embodiments of the present invention, synchronous pilots including odd synchronous pilots and even synchronous pilots are inserted in the frame, thus the frame synchronization may be accomplished according to the odd synchronous pilots and even synchronous pilots instead of the TPS, which lowers the complexity of the frame synchronization.

EMBODIMENTS OF THE INVENTION

The present invention is hereinafter described in detail with reference to accompanying drawings and embodiments.

In embodiments of the present invention, synchronous pilots including odd synchronous pilots and even synchronous pilots are inserted in a frame, and signals of inverse values are transmitted on the odd synchronous pilots and the even synchronous pilots; thus the frame synchronization is accomplished according to the odd synchronous pilots and the even synchronous pilots.

Figure 1:
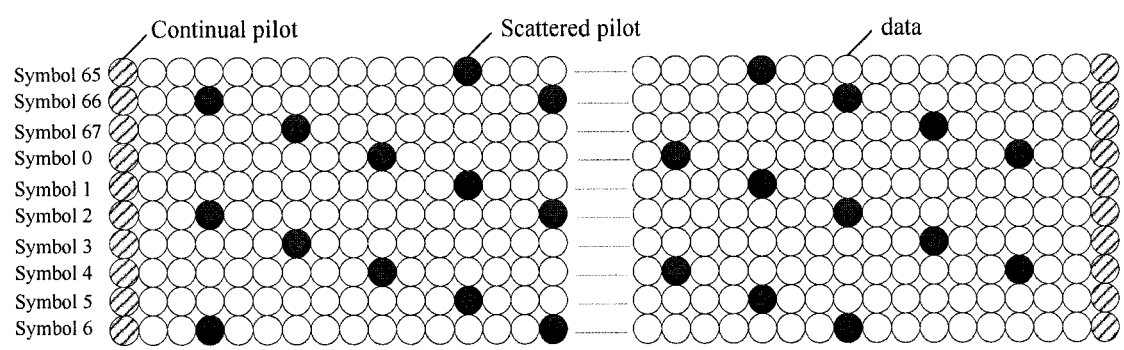
FIG. 1 is a schematic diagram illustrating a pilot insertion pattern in the DVB-T/H.
Figure 2:
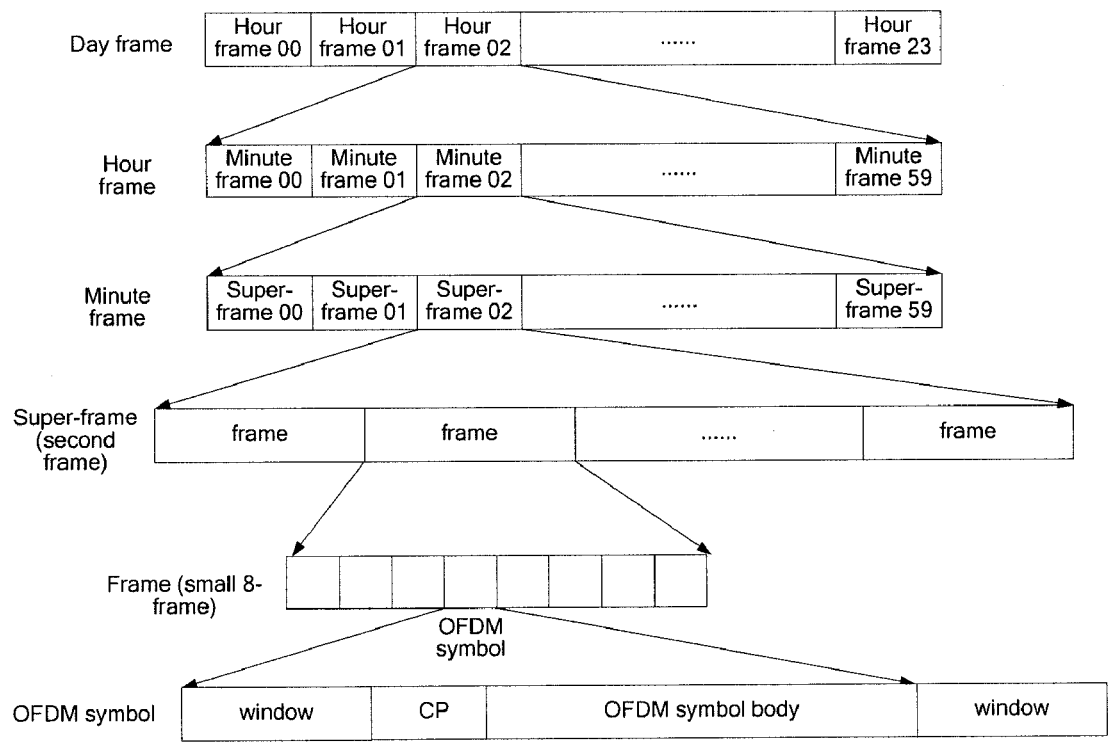
FIG. 2 is a schematic diagram illustrating a structure of a multi-frame in physical layer according to an embodiment of the present invention.

Referring to FIG. 2, a multi-frame structure is adopted in the physical layer in this embodiment. The multi-frame may include a day frame, an hour frame, a minute frame, a super-frame, a frame and an OFDM symbol according to their lengths. The multi-frame is transmitted periodically in the physical layer. Specifically, the day frame, hour frame, minute frame and super-frame are synchronized with the nature time, i.e., the beginning of these four kinds of frames coincide with that of a day, an hour, a minute and a second, respectively. The durations of the four kinds of frames are one day, one hour, one minute and one second, respectively. Since the duration of the super-frame is one second, the super-frame is also referred to as a second frame. A super-frame consists of several frames, and each frame consists of 8 OFDM symbols. Therefore, the frame is also referred to a small 8-frame. The OFDM symbol includes a pre-window, a Cycle Prefix (CP), an OFDM symbol body and a post-window.

The frame consisting of 8 OFDM symbols may reduce the time required for the frame synchronization; moreover, carriage of the PCS by 8 OFDM symbols may improve the time diversity and the flexibility of program carriage and transmission.

Figure 3:
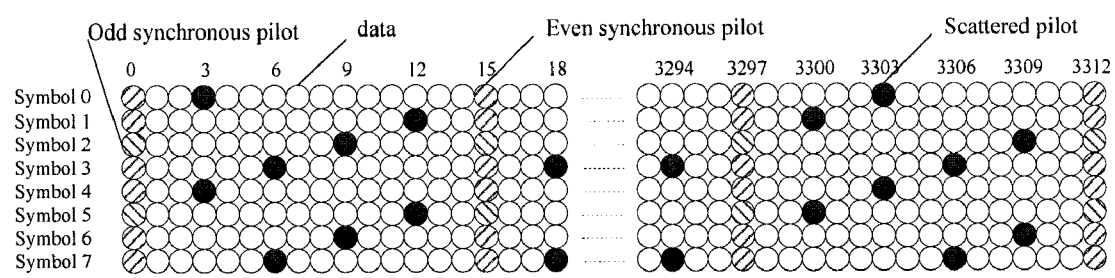
FIG. 3 is a schematic diagram illustrating a pilot insertion pattern according to an embodiment of the present invention.

FIG. 3 is a schematic diagram illustrating a pilot insertion pattern according to an embodiment of the present invention. As shown in FIG. 3, a frame consists of 8 OFDM symbols with indexes 0~7. The circles denote sub-carriers, where circles filled with biases denote synchronous pilots, solid circles denote scattered pilots and hollow circles denote data sub-carriers.

In FIG. 3, for the OFDM symbol of index n, carries for which index k belongs to the subset $\{k=K_{min}+3\times[(3\times n+1) \bmod 4]+12\times p | p \in Z, p \geq 0, k \in [K_{min}, K_{max}]\}$ are scattered pilots. Where n is the index of the OFDM symbol ranging from 0 to 7; p is an integral that takes all possible values greater than or equal to zero; in the 2K mode, $K_{min}=0$, $K_{max}=1656$, i.e., the number of useful sub-carriers nSubCrrNum=1657; in the 4K mode, $K_{min}=0$, $K_{max}=3312$, i.e., the number of useful sub-carriers nSubCrrNum=3313. If there is a superposition between the locations of a scattered pilot and a synchronous pilot the synchronous pilot is inserted at the location. It should be noted that the locations of the scattered pilots may adopt other distributions and are not limited to that shown in FIG. 3.

Table 2 shows carrier indices for the synchronous pilot carriers in an OFDM symbol in accordance with the locations in the 2K mode and 4K mode. The minimum distance separating two synchronous pilots are at least 15 sub-carriers and the distribution of the synchronous pilots is generally average. In FIG. 3, there are 192 pilot sub-carriers in one OFDM symbol in the 2K mode, including 72 synchronous pilots and 120 scattered pilots. There are 384 pilot sub-carriers, including 144 synchronous pilots and 240 scattered pilots in the 4K mode.

TABLE 2

| 2K Mode | 4K Mode |
|---|---|
| 0, 84, 168, 252, 348, 444, 540, 636, 732, 924, 1020, 1116, 1212, 1308, 1404, 1488, 1572, 1656 | 0, 84, 168, 252, 348, 444, 540, 636, 732, 828, 924, 1020, 1116, 1212, 1308, 1404, 1488, 1572, 1740, 1824, 1908, 2004, 2100, 2196, 2292, 2388, 2484, 2580, 2676, 2772, 2868, 2964, 3060, 3144, 3228, 3312 |
| 15, 99, 183, 279, 375, 471, 567, 663, 759, 843, 939, 1035, 1131, 1227, 1323, 1419, 1503, 1587 | 15, 99, 183, 279, 375, 471, 567, 663, 759, 843, 939, 1035, 1131, 1227, 1323, 1419, 1503, 1587, 1671, 1755, 1839, 1935, 2031, 2127, 2223, 2319, 2415, 2511, 2607, 2703, 2799, 2895, 2991, 3075, 3159, 3243 |
| 42, 126, 210, 306, 402, 498, 594, 690, 786, 870, 966, 1062, 1158, 1254, 1350, 1446, 1530, 1614 | 42, 126, 210, 306, 402, 498, 594, 690, 786, 870, 966, 1062, 1158, 1254, 1350, 1446, 1530, 1614, 1698, 1782, 1866, 1962, 2058, 2154, 2250, 2346, 2442, 2538, 2634, 2730, 2826, 2922, 3018, 3102, 3186, 3270 |
| 69, 153, 237, 333, 429, 525, 621, 717, 813, 897, 993, 1089, 1185, 1281, 1377, 1473, 1557, 1641 | 69, 153, 237, 333, 429, 525, 621, 717, 813, 897, 993, 1089, 1185, 1281, 1377, 1473, 1557, 1641, 1725, 1809, 1893, 1989, 2085, 2181, 2277, 2373, 2469, 2565, 2661, 2757, 2853, 2949, 3045, 3129, 3213, 3297 |

Other distributions of the synchronous pilots may be similar to that in Table 2 and will not be described in detail herein.

To facilitate the frame synchronization, the synchronous pilots are divided into odd synchronous pilots and even synchronous pilots. Specifically, the synchronous pilots in OFDM symbols 2 and 5 are the odd synchronous pilots, corresponding to the circles filled with rightward biases in FIG. 3; the synchronous pilots in OFDM symbols 0, 1, 3, 4, 6 and 7 are the even synchronous pilots, corresponding to the circles filled with leftward biases in FIG. 3.

A reference sequence transmitted on the useful sub-carriers may be generated by a Pseudo Random Binary Sequence (PRBS) generator. For example, generate a sequence W, and take the sequence W as the reference sequence. Each useful sub-carrier bears one bit of the sequence W, i.e., $W_i$, where i=0~nSubCrrNum−1. The polynomial for the PRBS generator may be $X^{16}+X^{12}+X^3+X+1$, and the operation of the PRBS generator includes: initialize the PRBS generator for each OFDM symbol and generate nSubCrrNum bits, specifically, the initialization sequence is set to be all 1.

The polynomial for the PRBS generator is not limited to the above form and may also be $X^{11}+X^2+1$, etc. In other words, the reference sequence transmitted on the useful sub-carriers is not limited, as long as it is known and consistent at the transmitter and receiver.

Implement a BPSK modulation to the $W_i$ to get a complex modulation symbol $C_i$. The detailed modulation process is given as follows:

$$Re\{C_i\}=2\times(2\times W_i-1), Im\{C_i\}=0$$

For the nSubCrrNum useful sub-carriers of an OFDM symbol, the signals on the synchronous pilot sub-carriers are $C_i$ and the signals on the data sub-carriers are reassigned to the actually transmitted signals. In order to make the power gains of the pilot constellations higher than those of the data constellations, the powers of the pilot constellations are normalized to values larger than 16/9, such as 4. The powers of the pilot constellations may also be normalized to other values larger than those of the data constellations, such as 64/25. The pilot constellations herein include the synchronous pilot constellations and the scattered pilot constellations.

The signals on the scattered pilots $S_k=C_k$, where $k \in \{k=K_{min}+3 \times [(3 \times n+1) \bmod 4]+12 \times p | p \in Z, p \geq 0, k \in [K_{min}, K_{max}]\}$;

the signals on the even synchronous pilots $V_a=C_a$;

the signals on the odd synchronous pilots $V_b=-C_b$, i.e., the signals on the odd synchronous pilots and the signals on the even synchronous pilots have inverse values.

The numerical values of a and b are shown in Table 2.

Figure 4:
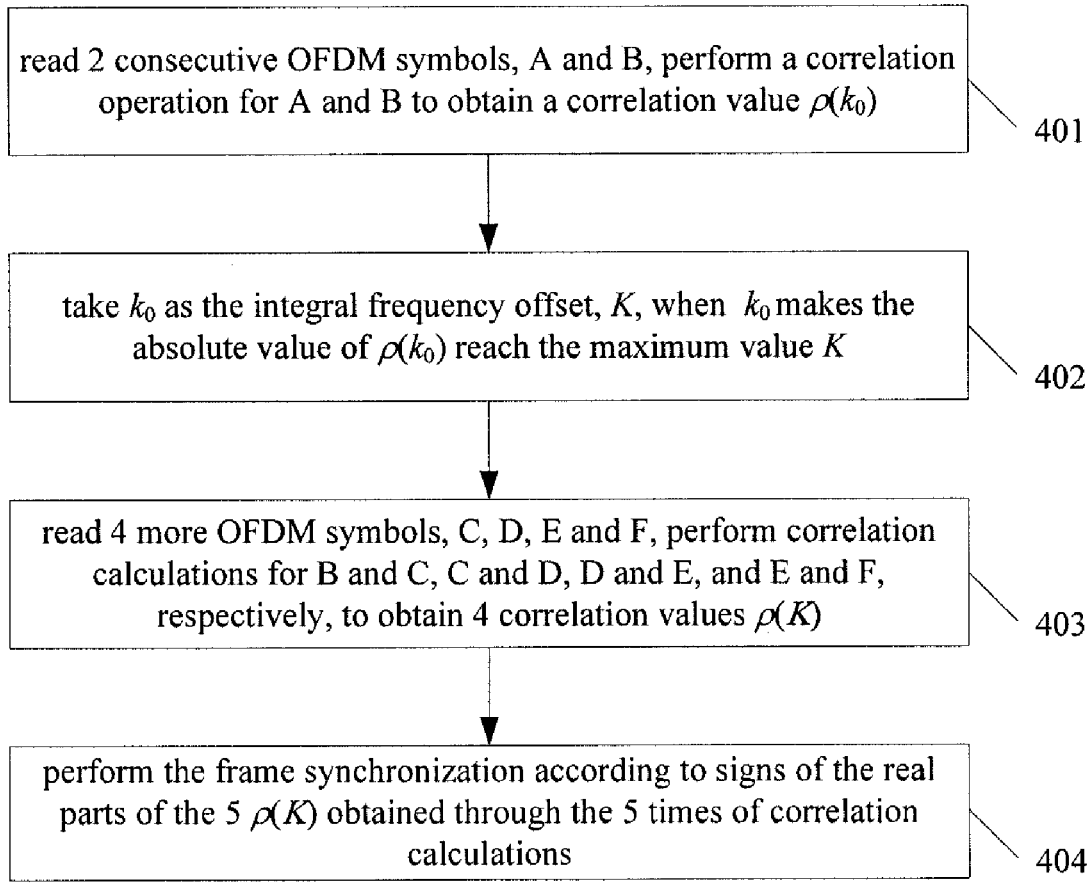
FIG. 4 is a flowchart of a process of frame synchronization according to an embodiment of the present invention.

According to the above frame structure and pilot insertion pattern, the process of frame synchronization is hereinafter described. As shown in FIG. 4, the method for frame synchronization according to an embodiment of the present invention includes the following steps.

Step 401: read 2 consecutive OFDM symbols, A and B, perform a correlation operation for A and B according to the following formula to obtain a correlation value $\rho(k_0)$, $$\rho(k_0) = \sum_{k_{c\_p}} \{R(u+1, k_{c\_p}+k_0) \cdot \mathrm{conj}[R(u, k_{c\_p}+k_0)]\},$$

where R(u, v) denotes a complex modulation symbol in OFDM symbol u at sub-carrier v, conj(R) denotes the complex conjugate of R, $k_{c\_p}$ denotes the index of the sub-carrier of the synchronous pilot, and $(k_{c\_p}+k_0) \in \{0, 1, \ldots, \text{nSubCrNum}-1\}$.

Step 402: take $k_0$ as the integral frequency offset K when $k_0$ makes the absolute value of $\rho(k_0)$, i.e., the value of $|\rho(k_0)|$ reaches the maximum value.

If the integral frequency offset is K, there is a maximum value of $|\rho(k_0)|$ at $k_0=K$, i.e., $k_0$ corresponding to the maximum value of $|\rho(k_0)|$ is the integral frequency offset, K, where $$K = \max_{k_0} |\rho(k_0)|.$$

Step 403: read 4 more OFDM symbols, C, D, E and F, perform correlation calculations for B and C, C and D, D and E, and E and F, respectively, to obtain 4 correlation values, $\rho(K)$, where $$\rho(K) = \sum_{k_{c\_p}} \{R(u+1, k_{c\_p}+K) \cdot \mathrm{conj}[R(u, k_{c\_p}+K)]\}.$$

Step 404: perform the frame synchronization according to signs of the real parts of the 5 $\rho(K)$ obtained through the 5 times of correlation calculations.

The 5 $\rho(K)$ are the correlation values obtained through the correlation calculations of A and B, B and C, C and D, D and E, and E and F, respectively.

Since the signals on the odd synchronous pilots and those on the even synchronous pilots have inverse values, there will be positive real parts and negative real parts of the $\rho(K)$ when performing the correlation calculations.

To facilitate the frame synchronization, a relationship between the signs of the real parts of the correlation values and the locations of the OFDM symbols in the frame may be established in advance. Thus, after m consecutive OFDM symbols are read and the correlation calculations are performed to obtain m−1 correlation values, the frame synchronization may be performed according to the signs of the real parts of the correlation values and the relationship established in advance.

In this embodiment, the frame synchronization may be accomplished by reading 6 consecutive OFDM symbols. The relationship between the signs of the real parts of the correlation values between the 6 consecutive OFDM symbols in the frame and the locations of the 6 consecutive OFDM symbols in the frame is shown in FIG. 3. For example, supposing that the signs of the real parts of the 5 $\rho(K)$ obtained through reading 6 consecutive OFDM symbols are "− − + + +", respectively, it may be known through looking up Table 3 that the first OFDM symbol of the 6 consecutive OFDM symbols is the $4^{th}$ one in the frame.

TABLE 3

| signs of the real parts of the 5 $\rho(K)$ | location of the first OFDM symbol read in the frame |
| --- | --- |
| + − − + − | the $0^{th}$ OFDM symbol |
| − − + − − | the $1^{st}$ OFDM symbol |
| − + − − + | the $2^{nd}$ OFDM symbol |
| + − − + + | the $3^{rd}$ OFDM symbol |
| − − + + + | the $4^{th}$ OFDM symbol |
| − + + + − | the $5^{th}$ OFDM symbol |
| + + + − − | the $6^{th}$ OFDM symbol |
| + + − − + | the $7^{th}$ OFDM symbol |

After the frame synchronization, the locations of the scattered pilots may be determined according to the distribution of the scattered pilots, and the channel estimation and demodulation and decoding may be performed after the determination of the locations of the scattered pilots.

It should be noted that the number and the distribution of the synchronous pilots and the scattered pilots may be adjusted according to the practical situations and are not limited to the above description. Moreover, the distribution of the odd synchronous pilots and the even synchronous pilots are also not limited to the above scheme and may also adopt other distributions as far as it is convenient for the frame synchronization. For example, the synchronous pilots in the OFDM symbols 3 and 6 may be taken as the odd synchronous pilots and the synchronous pilots in the OFDM symbols 0, 1, 2, 4, 5, and 7 may be taken as the even synchronous pilots. Table 3 needs to be adjusted in thus a case.

In addition, the frame structure may also be adjusted according to practical demands. For example, 16 OFDM symbols are included in a frame, and the pilot insertion pattern is designed and the frame synchronization is performed in terms of such a frame structure.

The foregoing is only the preferred embodiments of the present invention and is not for use in limiting the invention. Any modification, equivalent replacement or improvement made under the spirit and principles of this invention is included in the protection scope of the present invention.

What is claimed is:

1. A method of frame synchronization, comprising:
    inserting synchronous pilots comprising odd synchronous pilots and even synchronous pilots in a frame;
    transmitting first signals on the odd synchronous pilots, and transmitting second signals of inverse values of the first signals on the even synchronous pilots;

performing correlation calculations on consecutive Orthogonal Frequency Division Multiplex (OFDM) symbols in the frame to obtain complex correlation values;

establishing a relationship between signs of the real parts of the complex correlation values of the consecutive OFDM symbols and positions of the consecutive OFDM symbols in the frame; and synchronizing the frame according to the signs of the real parts of the complex correlation values and the relationship established.

2. The method of claim 1, wherein the complex correlation values are calculated according to:

$$\rho(K) = \sum_{k_{c\_p}} \{R(u+1, k_{c\_p}+K) \cdot \text{conj}[R(u, k_{c\_p}+K)]\}$$

wherein $\rho(K)$ denotes a correlation value, $R(u, v)$ denotes a complex modulation symbol in OFDM symbol u at sub-carrier v, conj(R) denotes complex conjugate of R, and $k_{c\_p}$ is an index of the synchronous pilot carrier, and K is an integral frequency offset.

3. The method of claim 1, wherein the minimum distance separating two synchronous pilots is 15 sub-carriers.

4. The method of claim 1, wherein the frame comprises 8 OFDM symbols.

5. The method of claim 4, wherein the odd synchronous pilots comprise synchronous pilots in OFDM symbols 2 and 5; and even synchronous pilots comprise synchronous pilots in OFDM symbols 0, 1, 3, 4, 6 and 7.

6. The method of claim 5, wherein synchronizing the frame comprises:

reading 6 consecutive OFDM symbols;

performing 5 times of the correlation calculations for every two consecutive OFDM symbols of the 6 consecutive OFDM symbols to obtain 5 correlation values;

synchronizing the frame according to the signs of the real parts of the 5 correlation values.

7. The method of claim 6, further comprising:

establishing a relationship between the signs of the real parts of the 5 correlation values and the positions of the 6 consecutive OFDM symbols in the frame; and synchronizing the frame according to the signs of the real parts of the 5 correlation values and the relationship established.

8. The method of claim 1, further comprising:

estimating the integral frequency offset according to the synchronous pilots before the frame synchronization.

9. The method of claim 1, further comprising:

inserting scattered pilots in the frame;

determining the locations of the scattered pilots after the frame synchronization to implement channel estimation.

10. The method of claim 9, wherein the scattered pilots belong to a subset $\{k = K_{min}+3\times[(3\times n+1)\bmod 4]+12\times p | p \in Z, p \geq 0, k \in [K_{min}, K_{max}]\}$, where n is the index of the OFDM symbol in the frame; p is an integral that takes all possible values greater than or equal to zero; $K_{min}=0$, $K_{max}$ equals to the number of useful sub-carriers minus 1.

11. The method of claim 1, wherein powers of the synchronous pilots are normalized to values larger than 16/9.

12. The method of claim 1, wherein signals transmitted on the synchronous pilots are obtained from a sequence generated by a Pseudo Random Binary Sequence (PRBS) generator after a Binary Phase Shift Keying (BPSK) modulation.

* * * * *